(No Model.)
I. W. SHALER.
Carbureter.
No. 242,379. Patented May 31, 1881.
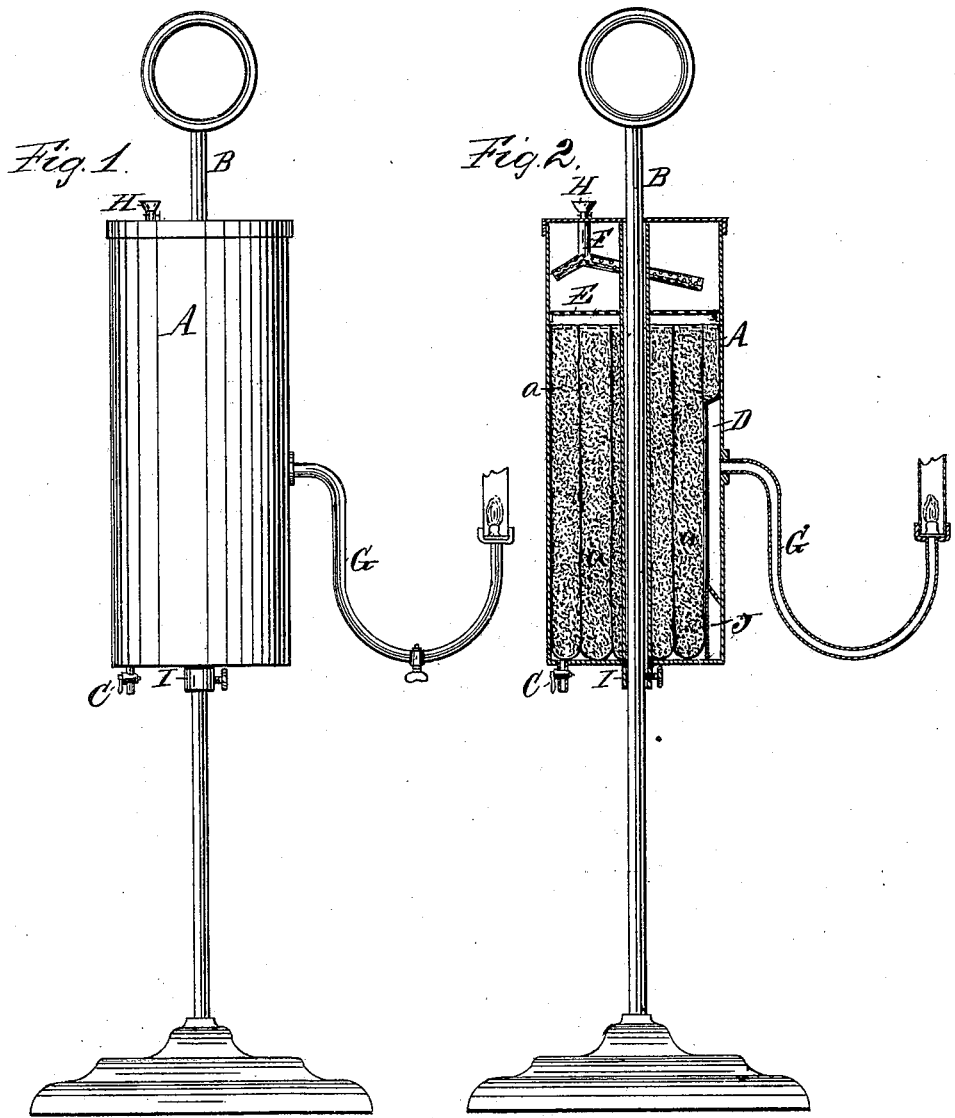
WITNESSES:
Charles Whitlock
Harry Edwards
INVENTOR:
Ira W. Shaler
BY H. D. Donnell
ATTORNEY.

UNITED STATES PATENT OFFICE.

IRA W. SHALER, OF BROOKLYN, ASSIGNOR, BY MESNE ASSIGNMENT, TO HOME GAS LIGHT COMPANY, OF NEW YORK, N. Y.

CARBURETOR.

SPECIFICATION forming part of Letters Patent No. 242,379, dated May 31, 1881.

Application filed February 3, 1881. (No model.)

*To all whom it may concern:*

Be it known that I, IRA W. SHALER, of the city of Brooklyn, county of Kings, State of New York, have invented certain new and useful Improvements in Carburetors; and I do hereby declare that the following is a full, clear, and exact description thereof, reference being had to the accompanying drawings, and to the letters of reference marked thereon.

Previous to my invention and discovery it has been customary to employ cotton, wool, and other fibrous material as a packing or absorbent in the reservoirs and tanks of carburetors, to generate the hydrocarbon gas to be used for heating and illuminating purposes. In all cases where the fibrous packing or absorbent has been and is used the vaporization is unequal and the supply of gas from the reservoir to the burner is not uniformly maintained.

To overcome this difficulty and to produce a steady light and uniform heat is the main object of my invention; which, to that end, consists, first, of a novel packing or absorbent formed by placing granulated wood (white-pine or bass-wood sawdust) in small sacks or bags, said sacks or bags being made of cotton cloth or other porpus material to be used in the reservoirs or tanks of carburetors, whereby the evaporation of hydrocarbon oils therein is equalized; second, in the arrangement and combination of parts of a gas lamp or carburetor, which will be hereinafter more fully described.

To enable those skilled in the art to which my invention pertains to make and use the same, I will now proceed to describe my improvement as I have successfully practiced the same, referring by letters of reference to the annexed drawings, which form part of this specification, and in which—

Figure 1 is a side elevation of my machine, and Fig. 2 is a longitudinal vertical section, showing the arrangement of the packing in the reservoir thereof.

A is a reservoir, which is made of any convenient size or shape. *a* represents the small bags filled with white pine or bass-wood sawdust, which are suitably placed in the reservoir.

B is a standard, which passes through the center of the reservoir, and is suitably separated therefrom by a tube, which standard is furnished with a check-nut and set-screw, I, for the purpose of setting the reservoir at any desired elevation.

C is a drip-cock placed in the lower end of the reservoir, the object of which is to ascertain when the reservoir is properly charged.

On one side of the reservoir is placed a chamber, D, which is closed at the top and open at the bottom, the entrance to said chamber being protected by a screen of wire or other suitable material.

Above the packing is a plate of perforated metal, E, which acts as a distributer of the fluid and air.

F is a perforated distributing-tube, the ends of which are closed, placed in the air-chamber of the reservoir, and so arranged that the supply of fluid and air to the reservoir is equally distributed over the upper surfaces of the packing, said distributing-tube being also used for the purpose of supplying the fluid and air to the reservoir. At the upper part of this distributing-tube is placed a cock, in which is suitably arranged a funnel-shaped opening, H, through which the fluid and air pass into the reservoir.

G is a bracket, made in about the usual form, provided with a stop-cock, one end of said bracket being attached to the reservoir, and the other end being furnished with a suitably-arranged Argand burner.

J is an additional chamber, into which the generated gas passes before entering the chamber D, said additional chamber being provided with a wire screen, arranged so as to give the gas free passage through the same.

The operation is as follows: When the reservoir is suitably packed with my improved packing and properly charged the air-cock in the distributing-tube is opened, thereby admitting air to the reservoir, which, becoming carbureted, descends into the chamber J, and passes thence into the chamber D, whence it is conveyed by the bracket to the burner.

Not only is my improved packing more efficient, but it is cheaper and more durable, than that formed of fibrous material, and by its use I am enabled to place the apparatus for generating gas from hydrocarbon oils or gasoline more nearly on a plane with the point of combustion.

I am aware that the use of sawdust as an absorbent, placed loosely in the compartments of a carburetor, either alone or commingled with "excelsior," has heretofore been suggested, and is shown and described in the patent to B. F. Grimes, dated August 25, 1874; also in the patent to B. Sloper, dated May 7, 1878; also in the patent to M. P. Fleming, dated September 16, 1879.

I am also aware that heretofore a packing formed of tubes of cotton fabric stretched over wire-coils, the interior thereof being filled with cotton or fibrous material, has been used, and is suggested and shown in the patent of P. Keller, dated June 3, 1879.

I am also aware that prior to my invention a funnel-shaped inlet-tube protected with wire-gauze was used in carburetors, and is shown and described in the patent of Joseph H. Bean, dated October 21, 1879, and also in the patent of R. Aslop, dated January 22, 1869.

I am also aware that some of the elements embraced in my carburetor are shown in prior patents; but I do not claim any one of those elements separately.

My invention is limited to my peculiar kind and form of packing, together with the elements of a carburetor, as hereinbefore described and set forth.

Having thus fully explained my invention so that any one skilled in the art can practice it, what I claim as new, and desire to secure by Letters Patent of the United States, is—

1. A packing for carburetors, formed of white-pine or bass-wood sawdust inclosed in bags or sacks, substantially as described, and for the purposes set forth.

2. In a carburetor, the combination of a perforated distributing-tube, F, perforated plate E, a packing formed of white-pine or bass-wood sawdust inclosed in bags or sacks, drip-cock C, chambers D J, bracket G, and funnel H, all constructed substantially as and for the purposes herein set forth.

IRA W. SHALER.

Witnesses:
CHARLES WHITLOCK,
HARRY EDWARDS.